US00RE42584E

(19) United States
(12) Reissued Patent
Hashimoto

(10) Patent Number: US RE42,584 E
(45) Date of Reissued Patent: Aug. 2, 2011

(54) OPTICAL DISC RECORDING AND REPRODUCING APPARATUS FOR PERFORMING A FORMATTING PROCESS AS A BACKGROUND PROCESS AND A METHOD FOR FORMATTING AN OPTICAL DISC BY A BACKGROUND PROCESS

(75) Inventor: Hirokuni Hashimoto, Munich (DE)

(73) Assignee: Ricoh Company, Ltd, Tokyo (JP)

(21) Appl. No.: 12/495,067

(22) Filed: Jun. 30, 2009

Related U.S. Patent Documents

Reissue of:
(64) Patent No.: 6,172,955
Issued: Jan. 9, 2001
Appl. No.: 09/135,588
Filed: Aug. 18, 1998

(30) Foreign Application Priority Data

Aug. 25, 1997 (JP) ..... 9-227921

(51) Int. Cl.
*G11B 20/12* (2006.01)
*G11B 7/00* (2006.01)

(52) U.S. Cl. ..... 369/53.37; 369/59.25; 369/47.1; 369/47.53; 710/17

(58) Field of Classification Search ..... None
See application file for complete search history.

(56) References Cited

U.S. PATENT DOCUMENTS

| | | | |
|---|---|---|---|
| 4,924,330 | A | 5/1990 | Seamons et al. |
| 5,513,166 | A | 4/1996 | Tokumitsu et al. |
| 5,655,150 | A | 8/1997 | Matsumoto et al. |
| 5,706,271 | A | 1/1998 | Hashimoto |
| 6,009,058 | A | 12/1999 | Sims, III et al. |
| 6,046,968 | A | 4/2000 | Abramovitch et al. |
| 6,172,955 | B1 | 1/2001 | Hashimoto |

FOREIGN PATENT DOCUMENTS

| | | |
|---|---|---|
| JP | 5-12669 | 1/1993 |
| JP | 5-12669 A | 1/1993 |
| JP | 5-143997 | 6/1993 |

*Primary Examiner* — Muhammad N Edun
(74) *Attorney, Agent, or Firm* — Cooper & Dunham, LLP

(57) ABSTRACT

An optical disc recording and reproducing apparatus can record data, which is provided in a packet having a fixed length, on an optical disc without waiting for a long time for a completion of a formatting operation. The optical disc is formatted by a formatting process performed as a background process so that another process is acceptable after a start of the formatting process. The formatting process is performed so as to fill at least a predetermined part of a recording area of said optical disc by packets having a fixed length.

28 Claims, 8 Drawing Sheets

OPTICAL DISC RECORDING AND REPRODUCING APPARATUS FOR PERFORMING A FORMATTING PROCESS AS A BACKGROUND PROCESS AND A METHOD FOR FORMATTING AN OPTICAL DISC BY A BACKGROUND PROCESS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to an optical disc recording and reproducing apparatus and, more particularly, to an optical disc recording and reproducing apparatus which records information on a rewritable optical disc such as a CD-RW.

2. Description of the Related Art

A minimum unit for reproduction of information recorded on a recording area of a compact disc (CD), a recordable optical disc (CD-R) or a rewritable optical disc (CD-RW) is defined as a block of a recording area. Each block can contain information of about 2,048 to 2,352 bytes.

A minimum unit for recording information on an optical disc such as a CD-R or a CD-RW is defined as a packet. Each packet comprises at least one user data block, five link blocks preceding the user data block and two link blocks subsequent to the user data block. The five link blocks preceding the user data block include one link block and four run-in blocks. The two link blocks subsequent to the user data block include two run-out blocks.

The link blocks are required for interconnecting a plurality of packets when information is recorded on an optical disc such as a CD. The link block does not contain user data. It should be noted that a rule for recording data on a CD is defined by a predetermined standard. Such a rule is referred to as a "linking rule".

There are two methods for recording data on an optical disc such as a recordable compact disc (CD-R) or a rewritable compact disc (CD-RW). One of the methods is referred to as a "track at-once method" and the other is referred to as a "packet write method".

The track at-once method is for recording information on a track all at one time by using a single packet. The user data blocks in the track are consecutive, and there are no link blocks between the user data blocks. A single track constitutes a recording unit, and ninety-nine tracks can be formed on the optical disc at maximum. A start address and an end address of each track are recorded on a separate area of the optical disc as a "table of contents (TOC)".

On the other hand, the packet write method is for recording information on a track by dividing the track into a plurality of packets so that the information is recorded on an individual packet basis. Since this method records information by each individual packet, each user data block is discretely located in a single track and link blocks are provided between adjacent ones of user data blocks.

The packet write method is classified into two types, that is, a "fixed packet write method" and a "variable packet write method". In the fixed packet write method, a number of user data blocks within a track is set to a fixed number. The number of user data blocks within a packet is referred to as a packet length or packet size. On the other hand, in the variable packet write method, packets having various packet lengths are provided in a single track.

The Universal Disc format (UDF) is a file system that uses the fixed packet write system. The UDF is used by various devices. The UDF utilizes a recording format that takes advantage of a feature of each device.

In a conventional CD-R drive such as one disclosed in Japanese Laid-Open Patent Application No.7-141660, when the recording is performed in accordance with the packet write method, data to be recorded is added to previously recorded packets since only an addition of data is allowed for the CD-R. Accordingly, the UDF uses a variable packet write method referred to as a sequential UDF which can perform a recording only by adding data after the previously recorded data. Thus, there is no need to consider a format.

On the other hand, a CD-RW drive is capable of recording data on a CD-RW by overwriting. Thus, the CD-RW drive uses a random UDF which records data by each packet unit and reproduces the data by each block.

In order to record and reproduce data at random, the random UDF requires a formatting operation by previously recording packets on the entire recording area or a designated area of the CD-RW, each of the packets having a fixed length, so that the entire recording area or the designated area are filled by the packets. By this formatting operation, data can be randomly recorded on the recording area of the CD-RW, or data recorded on the CD-RW can be randomly reproduced.

However, when the above-mentioned formatting operation is performed, it takes a long time to fill the entire recording area or the designated area of the CD-RW by the packets. Thus, there is a problem in that a recording or reproducing operation cannot be performed and completion of the formatting operation data must be waited for when the formatting operation is being performed.

The recording capacity of the CD-RW is represented by a time for continuously performing a recording operation. For example, one minute of recording corresponds to 9 megabytes, and data corresponding to about 74 minutes can be recorded on a CD-RW. Thus, it takes about 40 minutes to complete a recording of data including the TOC even if the recording is performed at a double recording speed. This means that one must wait for about 40 minutes until a formatting operation is completed in order to initially use a blank or new CD-RW.

SUMMARY OF THE INVENTION

It is a general object of the present invention to provide an improved and useful optical disc recording and reproducing apparatus in which the above-mentioned problems are eliminated.

A more specific object of the present invention is to provide an optical disc recording and reproducing apparatus which can record data, which is provided in a packet having a fixed length, on an optical disc without waiting for a long time for a completion of a formatting operation.

Another object of the present invention is to provide a formatting method for formatting a rewritable optical disc without delaying a recording operation or a reproducing operation performed on the optical disc.

In order to achieve the above-mentioned objects, there is provided according to one aspect of the present invention an optical disc recording and reproducing apparatus, comprising:

recording means for recording data on a rewritable optical disc by using a fixed packet write method;

reproducing means for reproducing data recorded on the optical disc by the recording means; and background formatting means for formatting the optical disc by a formatting process performed as a background process so that another process is acceptable after a start of the formatting process, the formatting process being performed so as to fill at least a predetermined part of a recording area of the optical disc by packets having a fixed length.

According to the above-mentioned invention, since the formatting process is performed as a background process so that another process can be accepted when the formatting operation is being performed, execution of a recording operation or a reproducing operation may be performed without waiting until the formatting process is completed.

In the optical disc recording and reproducing apparatus according to the present invention, the background formatting means may include end-of-process notifying means for notifying completion of the formatting process before the formatting process is completed. Accordingly, a host computer connected to the optical disc recording and reproducing apparatus can accept another process to be performed by the optical disc recording and reproducing apparatus.

Additionally, in the optical disc recording and reproducing apparatus according to the present invention, the background formatting means may include means for interrupting the formatting process when a request for recording user data is made, recording the user data on the optical disc and thereafter resuming the formatting process. Accordingly, a recording operation of data can be started at any time even when the formatting process is being performed.

Additionally, in the optical disc recording and reproducing apparatus according to the present invention, the background formatting means may include means for resuming the formatting process by excluding an area in which the user data has been recorded from among areas to be formatted when the packets having a fixed length are not yet recorded in the area in which the user data has been recorded. Accordingly, the user data recorded while the formatting process is being performed is not erased by overwriting with the packets having the fixed length when the formatting process is resumed.

In the optical disc recording and reproducing apparatus according to the present invention, the background formatting means may include means for interrupting the formatting process when a request for reproducing data recorded in a designated area is made, reproducing the data and thereafter resuming the formatting process. Accordingly, a reproducing operation can be started at any time even when the formatting process is being performed.

Additionally, in the optical disc recording and reproducing apparatus according to the present invention, the background formatting means may include means for outputting previously prepared information as a result of attempted reproduction of data recorded in the designated area when the packets having the fixed length are not yet recorded in the designated area by execution of the formatting process. Accordingly, a reproducing operation can be substitutionally performed when a reproducing operation cannot be performed since the area of which data is to be reproduced has not been formatted.

Additionally, in the optical disc recording and reproducing apparatus according to the present invention, the background formatting means may include means for prohibiting ejection of the optical disc when a request for ejecting the optical disc is made during an execution of the formatting process. Accordingly, the optical disc is not ejected when the formatting process is being performed. Thus, the optical disc is prevented from being incompletely formatted.

Additionally, there is provided according to another aspect of the present invention a formatting method for formatting a rewritable optical disc, data being recorded on the optical disc by using a fixed packet write method, the formatting method comprising the steps of;

starting a formatting process for the optical disc as a background process, the formatting process being performed so as to fill a recording area of the optical disc by packets having a fixed length;

enabling execution of another process while the formatting process is being performed; and ending the formatting process after the recording area to be formatted has been filled by the packets having the fixed length.

According to the above-mentioned invention, since the formatting process is performed as a background process so that another process can be accepted when the formatting operation is being performed, execution of a recording operation or a reproducing operation may be performed without waiting until the formatting process is completed.

In the formatting method according to the present invention, the step of enabling may comprise the step of notifying of completion of the formatting process before the formatting process is completed.

Accordingly, a host computer connected to the optical disc recording and reproducing apparatus can accept another process to be performed by the optical disc recording and reproducing apparatus.

The formatting method according to the present invention may further comprise the steps of:

interrupting the formatting process when a request for recording user data is made;

recording the user data on said optical disc; and resuming the formatting process after the user data has been recorded.

Accordingly, a recording operation of data can be started at any time even when the formatting process is being performed.

Additionally, in the formatting method according to the present invention, the step of resuming may include the step of excluding an area in which the user data has been recorded from among areas to be formatted when the packets having the fixed length are not yet recorded in the area in which the user data has been recorded.

Accordingly, the user data recorded while the formatting process is being performed is not erased by overwriting with the packets having the fixed length when the formatting process is resumed.

Additionally, the formatting method according to the present invention may further comprise the steps of:

interrupting the formatting process when a request for reproducing data recorded in a designated area is made;

reproducing the data in the designated area; and resuming the formatting process after the data recorded in the designated area has been reproduced.

Accordingly, a reproducing operation of data can be started at any time even when the formatting process is being performed.

Additionally, in the formatting method according to the present invention, the step of reproducing may include the step of outputting previously prepared information as a result of attempted reproduction of the data recorded in the designated area when the packets having the fixed length are not yet recorded in the designated area by execution of the formatting process.

Accordingly, a reproducing operation can be substitutionally performed when a reproducing operation cannot be performed since the area of which data is to be reproduced has not been formatted.

Additionally, the formatting method according to the present invention may further comprise the step of prohibiting ejection of the optical disc when a request for ejecting the optical disc is made during an execution of the formatting process.

Accordingly, the optical disc is not ejected when the formatting process is being performed. Thus, the optical disc is prevented from being incompletely formatted.

Additionally, there is provided according to another aspect of the present invention a processor readable medium storing program codes causing an optical disc recording and reproducing apparatus to perform the above-mentioned formatting methods.

Other objects, features and advantages of the present invention will become more apparent from the following detailed description when read in conjunction with the accompanying drawings.

DETAILED DESCRIPTION OF THE PREFERRED EMBODIMENTS

Figure 1:
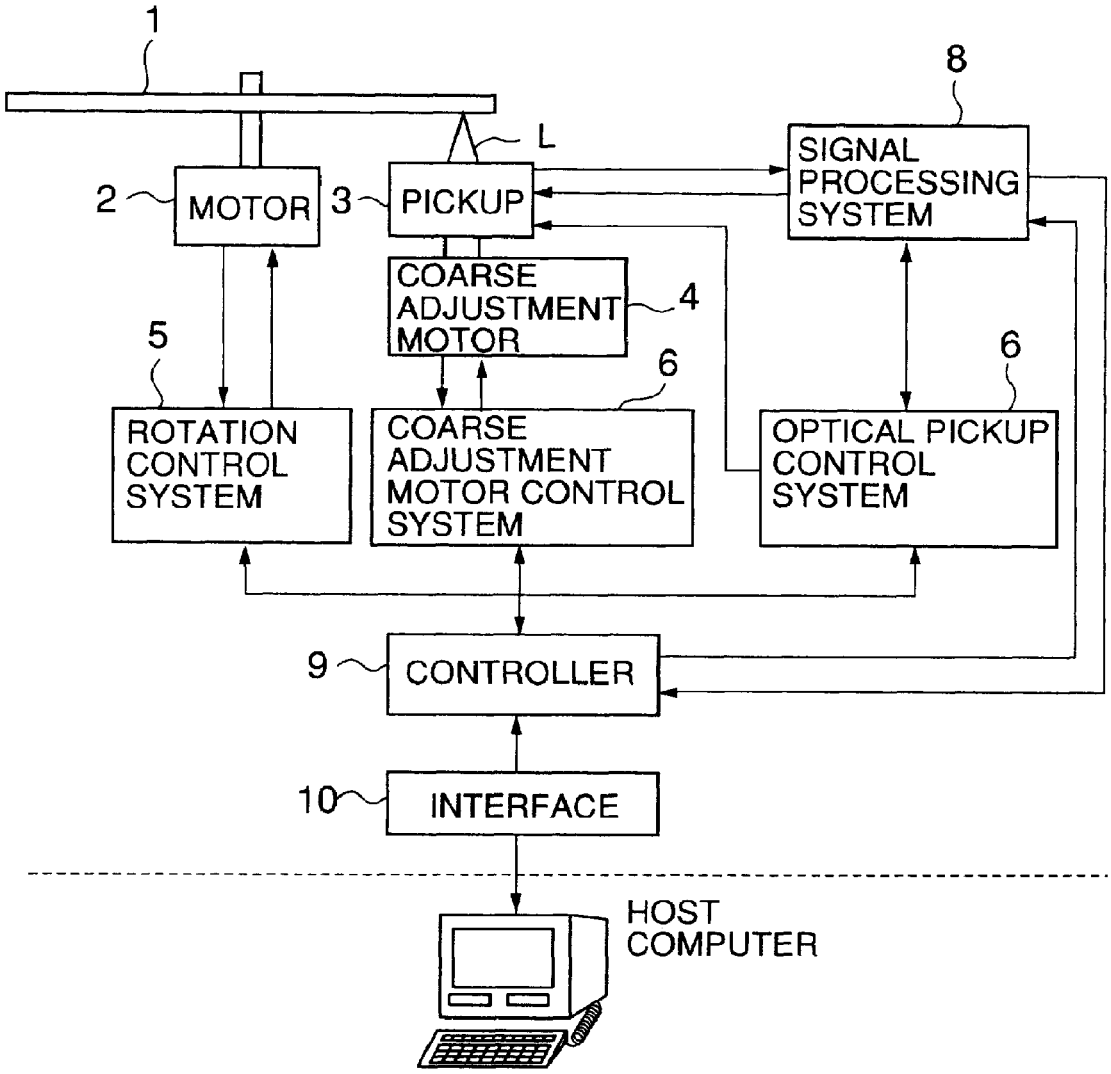
FIG. 1 is a block diagram of an optical disc recording apparatus according to a first embodiment of the present invention.

A description will now be given of a first embodiment of the present invention. FIG. 1 is a block diagram of an optical disc recording and reproducing apparatus according to the first embodiment of the present invention.

The optical disc recording and reproducing apparatus shown in FIG. 1 records information on an optical disc 1 such as a CD-RW by providing a train of pits spirally formed on the optical disc. The optical disc recording and reproducing apparatus reads the information on the optical disc 1 by information units referred to as user data blocks. The optical disc recording apparatus according to the present embodiment uses the above-mentioned fixed packet write method to record information on the optical disc 1.

As shown in FIG. 1, the optical disc recording and reproducing apparatus is provided with a spindle motor 2, an optical pickup 3 and a coarse adjustment motor 4. The spindle motor 2 rotates the optical disc 1. The optical pickup 3 has a semiconductor laser which projects a laser beam L onto a recording area of the optical disc 1. The coarse adjustment motor 4 moves the optical pickup 3 in a radial direction of the optical disc 1 in cooperation with a seek motor (not shown in the figure) provided in the optical pickup 3.

The optical disc recording and reproducing apparatus further includes a rotation control system 5, a coarse adjustment motor control system 6, an optical pickup control system 7 and a signal processing system 8. The rotation control system 5 controls operation of the spindle motor 2. The coarse adjustment motor control system 6 controls operation of the coarse adjustment motor 4. The optical pickup control system 7 controls operation of the optical pickup 3. The signal processing system 8 transmits information read by the optical pickup 3 and receives information to be recorded on the optical disc 1 by the optical pickup 3.

The optical disc recording apparatus is further provided with a controller 9 and an interface 10. The controller 9 controls the above-mentioned rotation control system 5, the coarse adjustment motor control system 6, the optical pickup control system 7 and the processing system 8. The interface 10 enables communication with an external host computer.

In the thus-constructed optical disc recording and reproducing apparatus, the optical pickup 3 is moved in the radial direction of the optical disc 1 while the optical disc 1 is rotated by the spindle motor 2 so as to record or read information by projecting the laser beam L from the semiconductor laser of the optical pickup 3 onto the recording area of the optical disc 1.

When the optical disc recording and reproducing apparatus shown in FIG. 1 records information, the controller 9 moves the optical pickup 3 in a radial direction of the optical disc 1 while the optical disc 1 is rotated. The laser beam L is projected from the optical pickup 3 onto the recording area of the optical disc 1 at a recording power level so as to record the information on the optical disc 1.

Additionally, when the optical disc recording and reproducing apparatus shown in FIG. 1 reproduces information recorded on the optical disc 1, the controller 9 moves the optical pickup 3 while the optical disc 1 is rotated. The laser beam L is projected from the optical pickup 3 onto the recording area of the optical disc 1 at a reproducing power level so as to read the information recorded on the optical disc 1. The reproduced information is transferred to the host computer via the interface 10.

In the optical disc recording and reproducing apparatus, the controller 9 controls a recording and reproducing operation of data in each track on the optical disc 1 according to the fixed packet write method. The controller 9 also controls a formatting operation for the optical disc 1 in a background process. That is, the controller 9 serves as means for recording data on the rewritable optical disc 1 by the fixed packet write method and reproducing the recorded data. Additionally, the controller 9 sends a notification to notify of a completion of a formatting operation immediately after the formatting operation has started when the optical disc 1 is formatted. Thereafter, the controller 9 serves as background formatting means for formatting the optical disc 1 in a background process so as to record fixed packets in the entire recording area or a designated area of the optical disc 1.

Further, the controller 9 serves to interrupt the formatting operation when a request is made for recording user data during the formatting operation in the background process and restart the formatting operation after the user data has been recorded. Additionally, the controller 9 serves to resume the formatting operation, after the formatting operation is restarted while preventing the area in which the user data is recorded from being formatted.

Additionally, the controller 9 serves to interrupt the formatting operation when a request is made for reproducing user data recorded in a designated area during the formatting operation in the background process and restart the formatting operation after the user data recorded in the designated area has been reproduced. Further, the controller 9 serves to output predetermined information as a result of attempted reproduction of data in a designated area when the fixed packets are not yet recorded in the designated area by the formatting operation. Additionally, the controller 9 serves to prohibit the optical disc 1 from being ejected when a request is made to eject the optical disc 1 while the formatting operation is performed as the background process.

Figure 2:
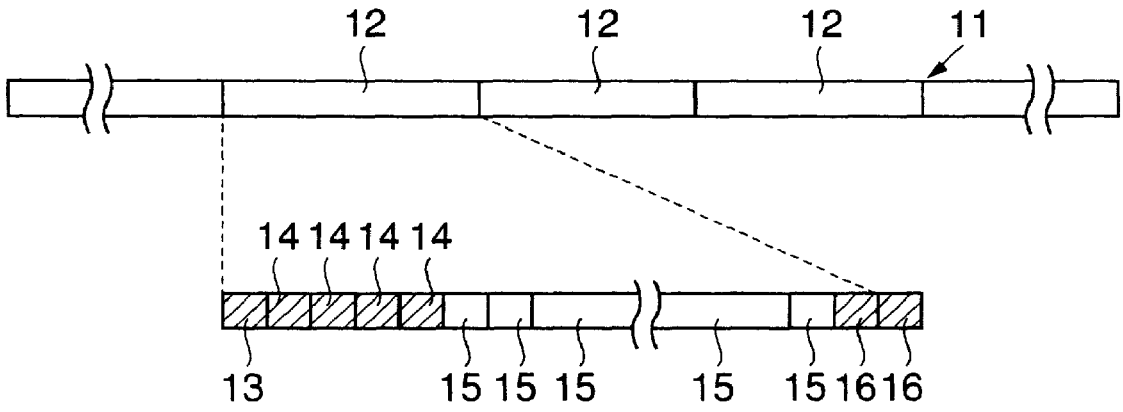
FIG. 2 is an illustration for explaining a track and a format of a packet used in a fixed packet write method.

A description will now be given of the fixed packet write method used by the optical disc recording and reproducing apparatus shown in FIG. 1. A description will also be given of a format of a packet used in the fixed packet write method. FIG. 2 is an illustration for explaining a track and a format of a packet recorded on the optical disc 1 in a fixed packet write method.

According to the fixed packet write method, a plurality of tracks are formed in a recording area of the rewritable optical disc 1. Each of the tracks is divided into a plurality of packets each having the same number of user data blocks so that information is recorded for each individual packet at once.

Accordingly, in the fixed packet write method, each of the packets 12 in a single track 11 in the recording area of the optical disc 1 has the same packet length, and each of the packets 12 has the same number of the user data blocks.

The packet 12 includes a plurality of user data blocks 15 which can be reproduced. Additionally, the packet 12 includes five link blocks preceding the user data blocks 15. The five link blocks consist of one link block 13 and four run-in blocks 14. The packet 12 further includes two link blocks subsequent to the user data blocks 14. The two link blocks consist of two run-out blocks 16. These link blocks are used for connecting the packets 12 to each other when data is recorded in the user data blocks 15 of the packets 12 in the track 11 of the optical disc 1.

Figure 3:
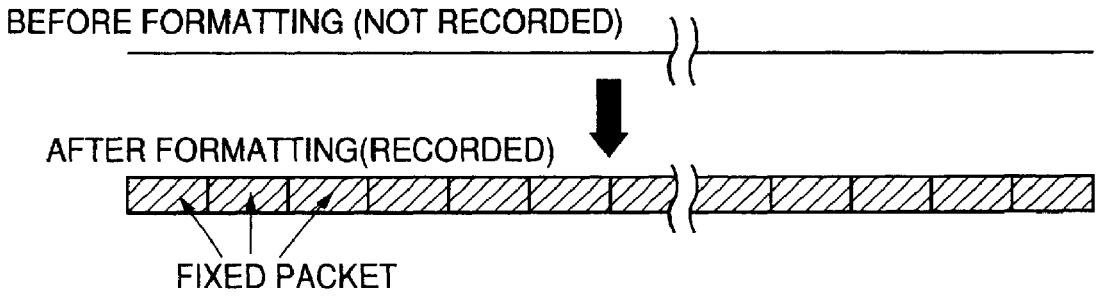
FIG. 3 is an illustration for explaining a format of a recording area of an optical disc which has been formatted by the optical disc recording and reproducing apparatus shown in FIG. 1.

FIG. 3 is an illustration for explaining a format of the recording area of the optical disc which is formatted by the optical disc recording and reproducing apparatus shown in FIG. 1. As shown in FIG. 3, when the entire recording area or a designated area of the optical disc 1 is subjected to the formatting operation according to the fixed packet recording method, the entire recording area or the designated area is filled by the fixed packets.

Figure 4:
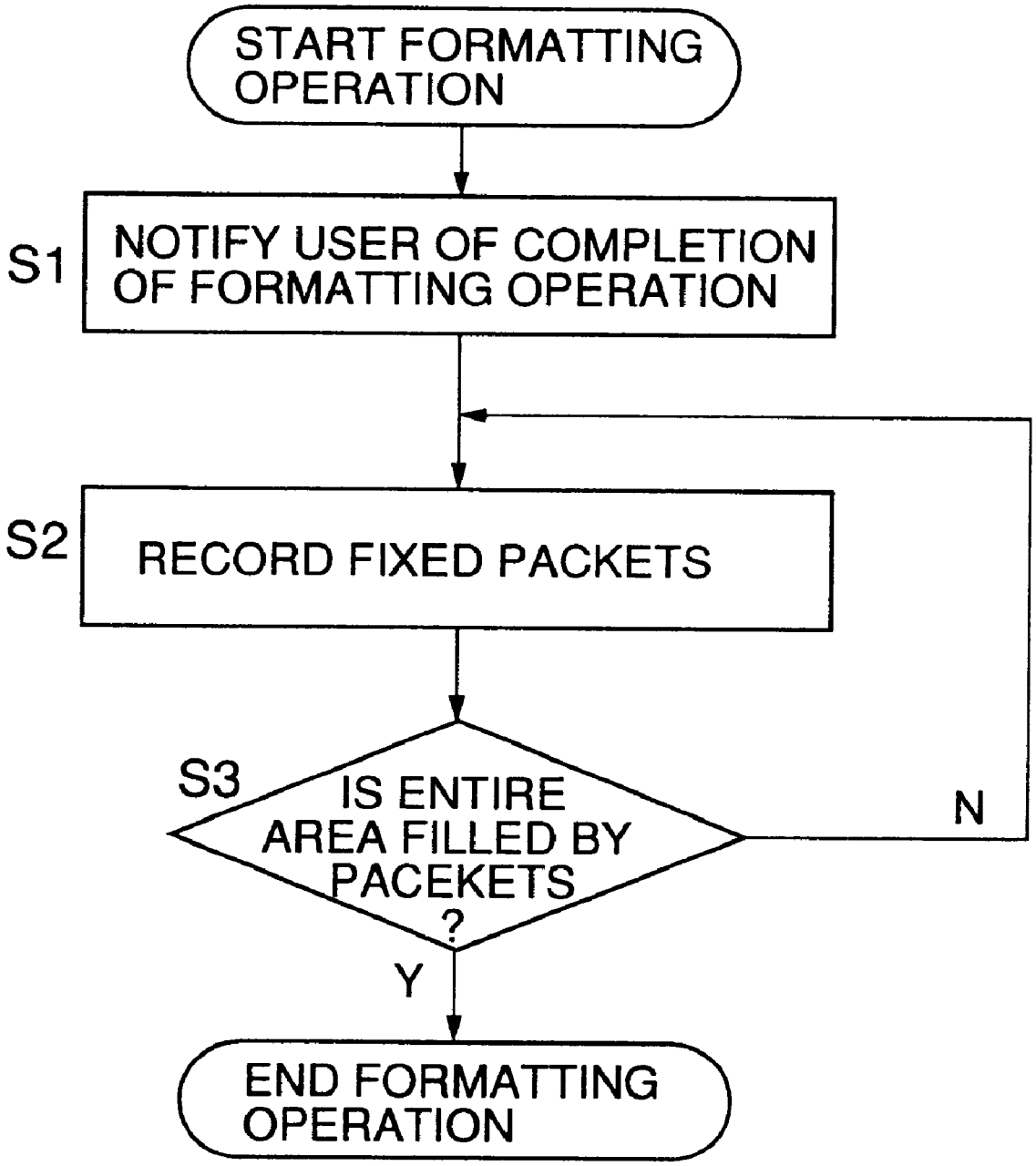
FIG. 4 is a flowchart of a formatting process performed by the optical disc recording and reproducing apparatus shown in FIG. 1, the formatting process being performed as a background process.

A description will now be given of a formatting process performed as a background process in the optical disc recording and reproducing apparatus shown in FIG. 1. FIG. 4 is a flowchart of the formatting process performed by the optical disc recording and reproducing apparatus shown in FIG. 1.

Immediately after the formatting process for the optical disc 1 is started, the controller 9 outputs, in step S1, a message to a host computer so as to notify a user (the host computer) that the formatting process has been completed. Then, in step S2, an actual formatting operation is performed as a background process of the host computer. In the formatting operation, the entire area or a designated area of the optical disc 1 is filled by packets having a fixed length. It is determined, in step S3, whether or not the area to be formatted is filled by the packets. If the area is not filled by the packets, the routine returns to step S2. If it is determined that the entire area is filled by the packets, the routine is ended.

In the above-mentioned formatting process, since the actual formatting operation is performed as a background process, recording or reproduction of data can be accepted by the host computer while the formatting operation is being progressed. Thus, the host computer dose not wait for a long time to accept the recording or reproduction of data even when the formatting process is being performed.

Figure 5:
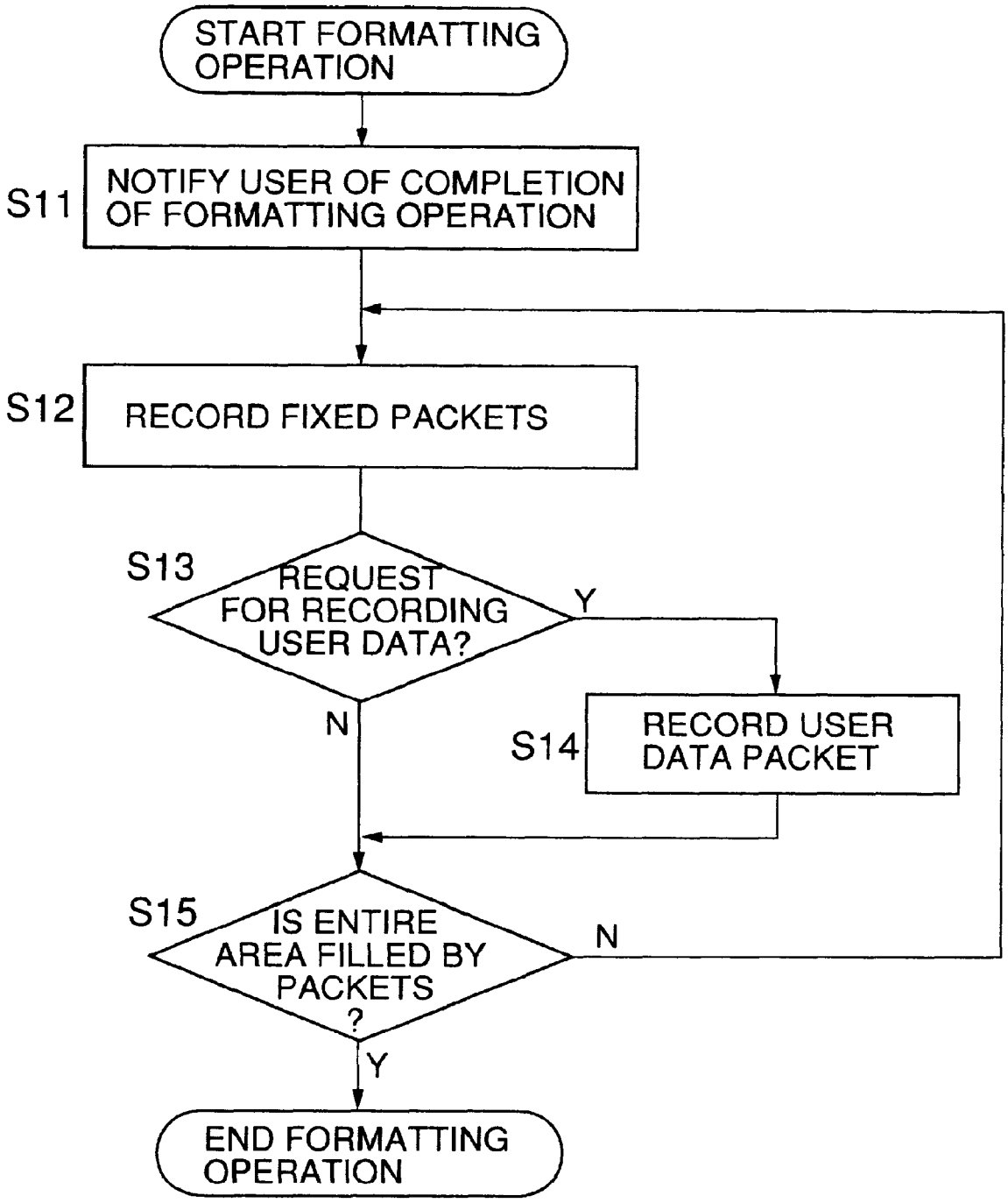
FIG. 5 is a flowchart of a formatting process performed by the optical disc recording and reproducing apparatus shown in FIG. 1 when a request for recording data on the optical disc is made while the formatting process is being performed as a background process.

A description will now be given of a case in which a request for recording data on the optical disc 1 is made during the above-mentioned formatting process. FIG. 5 is a flowchart of the formatting process performed as a background process when a request for recording is made during the formatting process.

Immediately after the formatting process for the optical disc 1 is started, the controller 9 outputs, in step S11, a message to a host computer so as to notify a user (the host computer) that the formatting process has been completed. Then, in step S12, an actual formatting operation is performed as a background process of the host computer. In the formatting operation, the entire area or a designated area of the optical disc 1 is filled by packets having a fixed length. It is then determined, in step S13, whether or not a request for recording is sent from the host computer.

If it is determined, in step S13, that a request for recording is not sent from the host computer, the routine proceeds to step S15. On the other hand, if it is determined, in step S13, that a request for recording is sent from the host computer, the routine proceeds to step S14. In step S14, the formatting operation is temporarily stopped so as to record a user data packet. After the recording of the user data packet is completed, the routine proceeds to step S15.

In step S15, it is determined whether or not the area to be formatted is filled by the packets. If the area is not filled by the packets, the routine returns to step S12. If it is determined that the entire area to be formatted is filled by the packets, the routine is ended.

According to the above-mentioned formatting process, a recording operation can be performed any time the formatting operation is being progressed.

However, if the data is recorded in an unformatted area where the fixed packets are not yet recorded by the formatting process being performed, it is possible that fixed packets are overwritten on the recorded data after the formatting process is restarted. This results in erasure of the recorded data. In order to avoid such a problem, the optical disc recording and reproducing apparatus according to the present invention performs a formatting process shown in FIG. 6.

Figure 6:
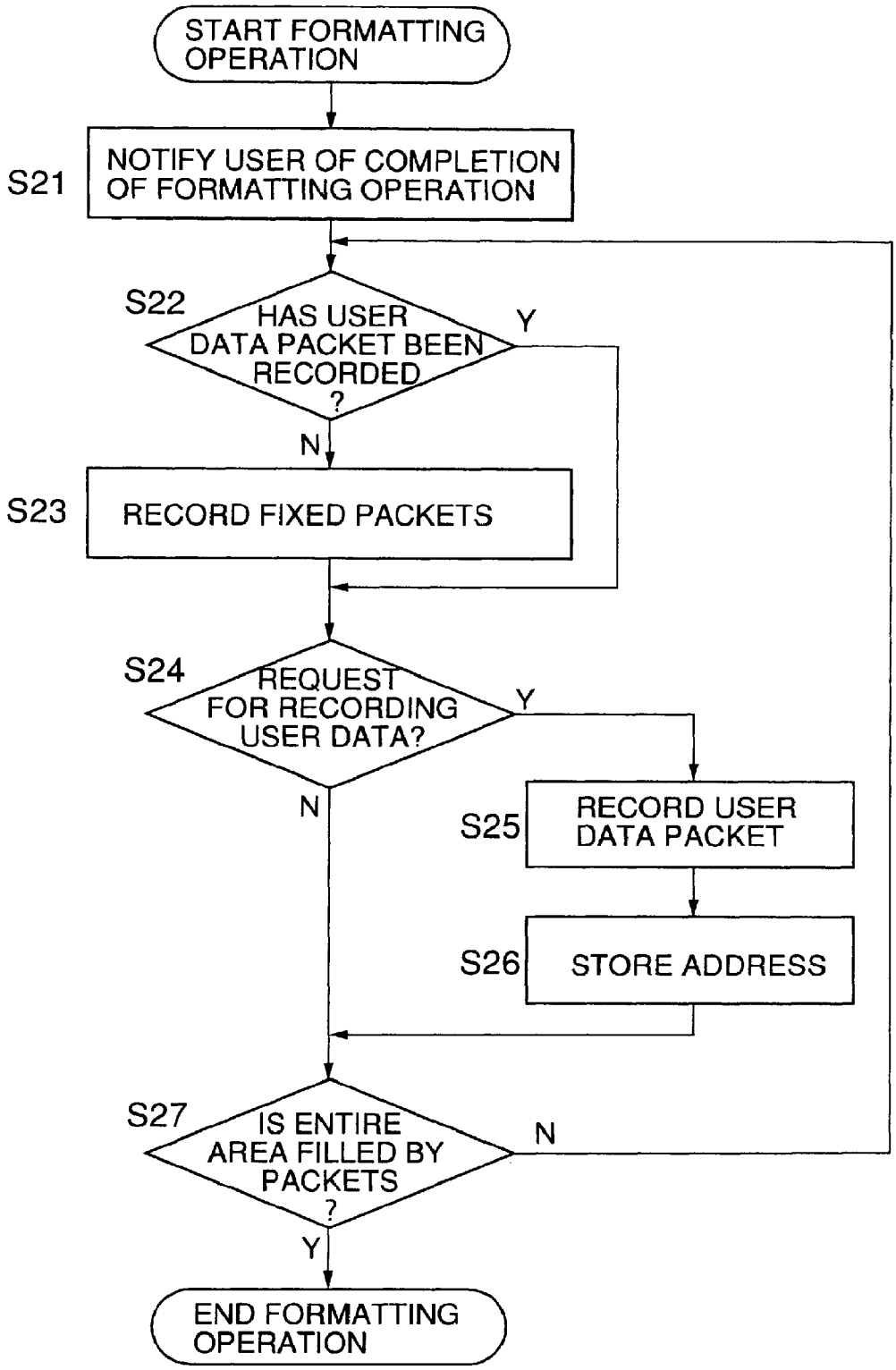
FIG. 6 is a flowchart of a formatting process performed by the optical disc recording and reproducing apparatus shown in FIG. 1 so as to prevent a recording area from being formatted, user data having been recorded in the recording area, while the formatting process is being performed as a background process.

FIG. 6 is a flowchart of the formatting process for preventing a data recorded area from being formatted.

Immediately after the formatting process for the optical disc 1 is started, *and before an background formatting operation of step S23,* the controller 9 outputs, in step S21, a message to a host computer so as to notify a user (the host computer) that the formatting process has been completed. It is then determined, in step S22, whether or not a user data packet has been recorded. If it is determined that the user data packet has been recorded, the routine proceeds to step S24. On the other hand, if it is determined that the user data packet has not been recorded, the routine proceeds to step S23. In step S23, an actual formatting operation is performed as a background process of the host computer. In the formatting operation, the entire area or a designated area of the optical disc 1 is filled by packets having a fixed length.

It is then determined, in step S24, whether or not a request for recording is sent from the host computer. If it is determined, in step S24, that a request for recording is not sent from the host computer, the routine proceeds to step S27. On the other hand, if it is determined, in step S24, that a request for recording is sent from the host computer, the routine proceeds to step S25 in which the formatting operation is temporarily stopped so as to record a user data packet. After the recording of the user data packet is completed, the routine proceeds to step S26. In step S26, the formatting operation is restarted and an address of the area in which the user data packet has been recorded is stored, and the routine proceeds to step S27.

In step S27, it is determined whether or not the area to be formatted is filled by the packets having a fixed length. If the area is not filled by the packets, the routine returns to step S22 so as to determine whether or not the user data packet has been recorded based on the address stored in step S26. If the user data packet has been recorded, the formatting process is continued while excluding the recorded area from being formatted. If the user data packet has not been recorded, the fixed packets are recorded. Accordingly, the process of steps S22 to S26 is repeated, and the routine is ended after the entire area to be formatted is filled by the fixed packets.

According to the above-mentioned formatting process, the fixed packets are not overwritten on the data which has been recorded while the formatting process is being performed. Thus, the recorded data is prevented from being undesirably erased after the formatting process is restarted.

Figure 7:
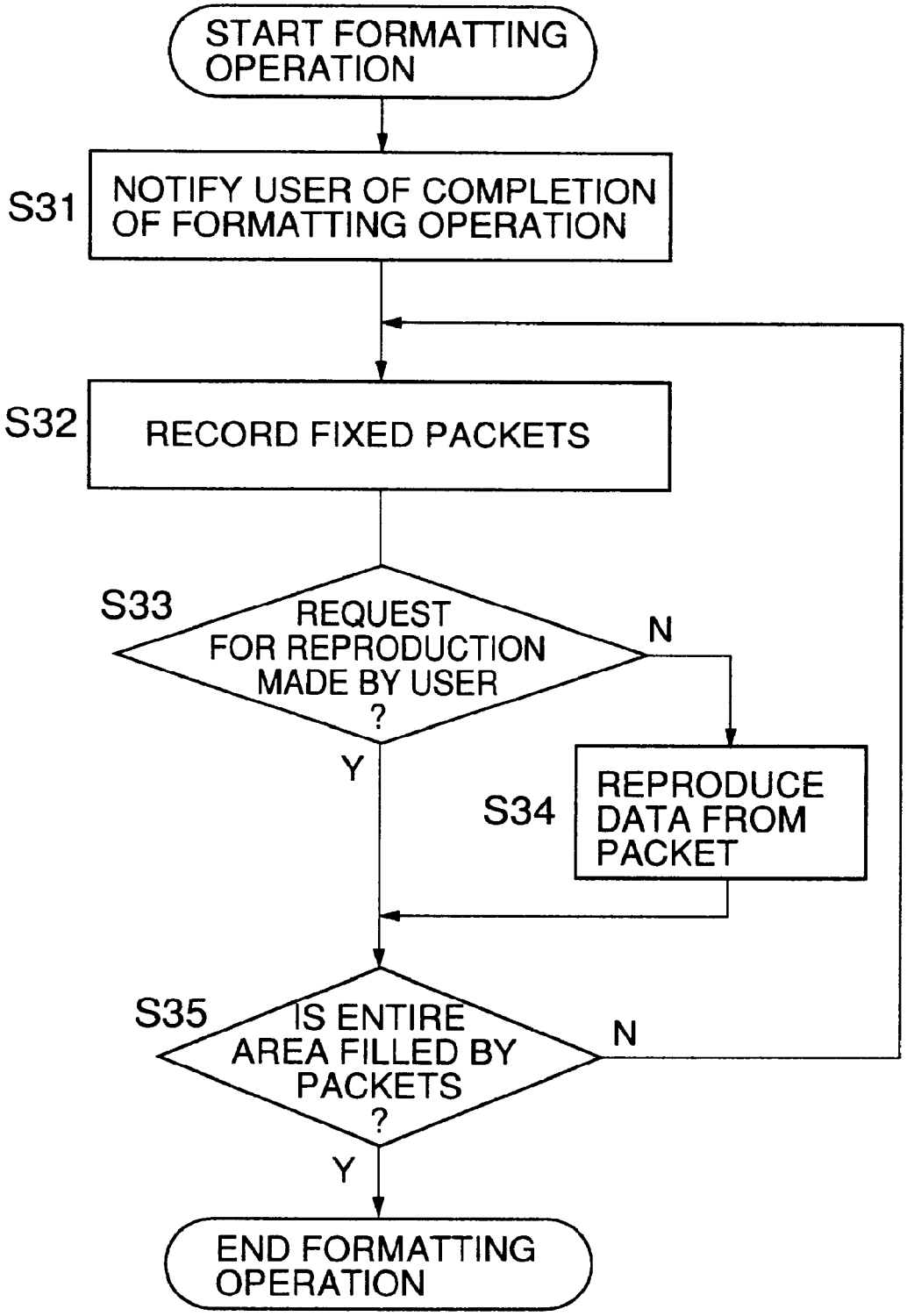
FIG. 7 is a flowchart of a formatting process performed by the optical disc recording and reproducing apparatus shown in FIG. 1 when a request for reproducing data recorded on the optical disc is made while the formatting process is being performed as a background process.

A description will now be given of a case in which a request for reproduction of data is made while the formatting operation is being performed. FIG. 7 is a flowchart of a process when a request for reproduction of data is made while the formatting operation is being performed as a background process in the optical disc recording and reproducing apparatus shown in FIG. 1.

In the process shown in FIG. 7, immediately after the formatting process for the optical disc 1 is started, the controller 9 outputs, in step S31, a message to a host computer so as to notify a user (the host computer) that the formatting process has been completed. Then, in step S32, an actual formatting operation is performed as a background process of the host computer. In the formatting operation, the entire area or a designated area of the optical disc 1 is filled by packets having a fixed length. It is then determined, in step S33, whether or not a request for reproducing data is sent from the host computer.

If it is determined, in step S33, that a request for reproducing data is not sent from the host computer, the routine proceeds to step S35. On the other hand, if it is determined, in step S33, that a request for reproducing data is sent from the host computer, the routine proceeds to step S34. In step S34, the formatting operation is temporarily stopped so as to reproduce data recorded on a designated area. After the reproduction of the data is completed, the routine proceeds to step S35.

In step S35, it is determined whether or not the area to be formatted is filled by the fixed packets. If the area is not filled by the fixed packets, the routine returns to step S32 so as to repeat the process of steps S32 to S34. If it is determined that the entire area to be formatted is filled by the fixed packets, the routine is ended.

According to the above-mentioned formatting process, a reproducing operation can be performed any time the formatting operation is being progressed.

If the fixed packets have not yet been recorded in the designated area in which the user data to be reproduced is recorded in the formatting operation performed as a background process, a reproducing operation cannot be performed since there is no packet to be reproduced. However, in order to have the user be unconscious of the formatting process being performed as a background process, it is better to reproduce data recorded in an unformatted area. Accordingly, in the optical disc recording and reproducing apparatus according to the present embodiment, data recorded in the unformatted area can be also reproduced while the formatting operation is being performed.

Figure 8:
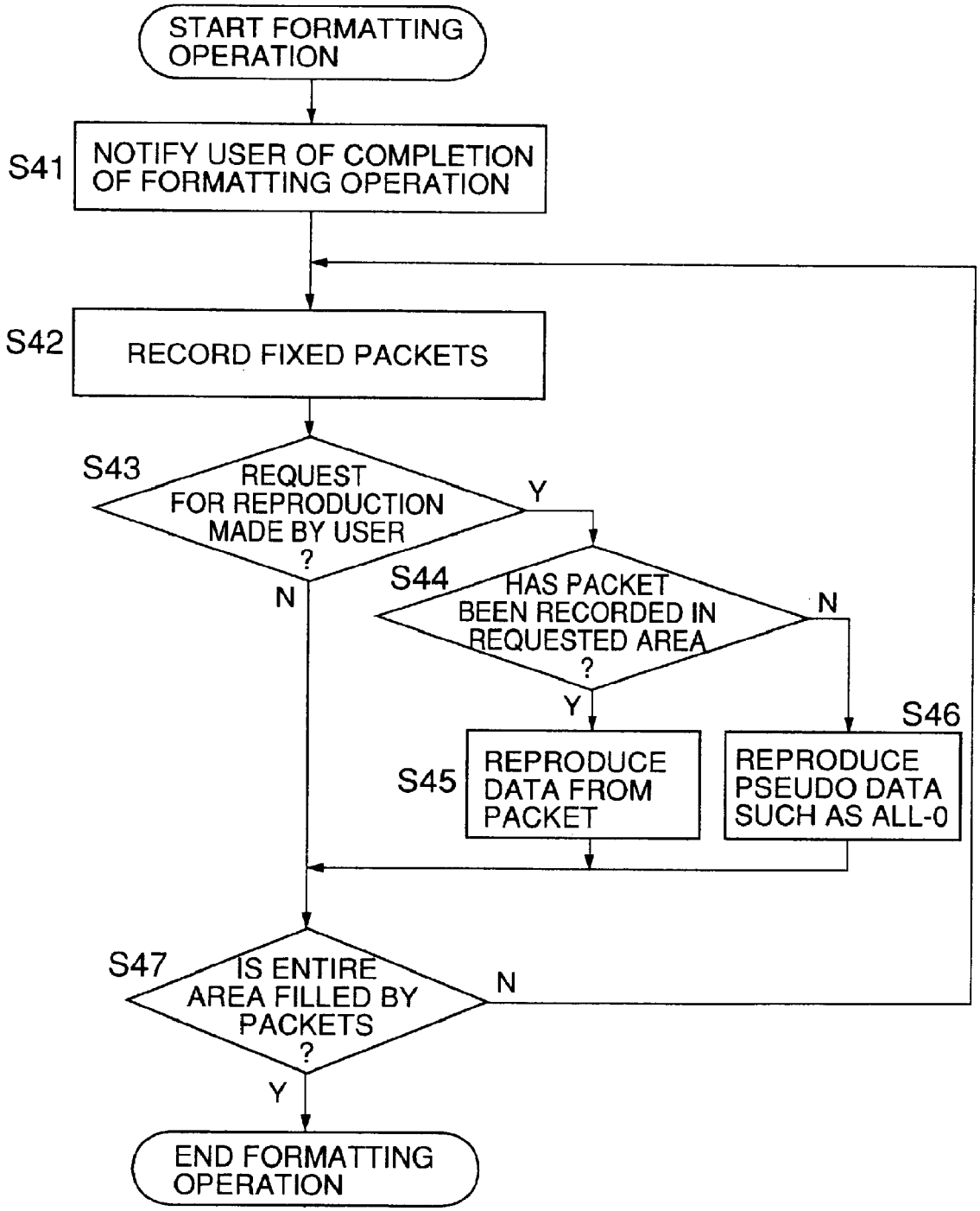
FIG. 8 is a flowchart of a formatting process performed by the optical disc recording and reproducing apparatus shown in FIG. 1 when reproduction is performed on an unformatted recording area while the formatting operation is being performed as a background process.

FIG. 8 is a flowchart of a process for performing a reproducing operation with respect to an unformatted area while the formatting operation is being performed as a background process.

In the process shown in FIG. 8, immediately after the formatting process for the optical disc 1 is started, the controller 9 outputs, in step S41, a message to a host computer so as to notify a user (the host computer) that the formatting process has been completed. Then, in step S42, an actual formatting operation is performed as a background process of the host computer. In the formatting operation, the entire area or a designated area of the optical disc 1 is filled by packets having a fixed length. It is then determined, in step S43, whether or not a request for reproducing data is sent from the host computer.

If it is determined, in step S43, that a request for reproducing data is not sent from the host computer, the routine proceeds to step S47. On the other hand, if it is determined, in step S43, that a request for reproducing data is sent from the host computer, the routine proceeds to step S44. It is then determined, in step S44, whether or not a packet has been recorded in the area (designated area) from which data is requested to be reproduced.

If it is determined, in step S44, that the packet has been recorded, the routine proceeds to step S45 so as to reproduce the data from the recorded packet, and the routine proceeds to step S47. On the other hand, if it is determined that the packet has not been recorded, the routine proceeds to step S46. In step S46, pseudo-data such as ALL-0 (all zero data) which is previously stored in a memory is reproduced, and the routine proceeds to step S47.

As mentioned above, if data has not been recorded in the packet from which data is requested to be reproduced, the pseudo-data is reproduced and output so as to enable a reproducing operation as if the formatting process has ended.

In step S47, it is determined whether or not the area to be formatted is filled by the fixed packets. If the area is not filled by the fixed packets, the routine returns to step S42 so as to repeat the process of steps S42 to S46. If it is determined that the entire area to be formatted is filled by the fixed packets, the routine is ended.

According to the above-mentioned formatting process, if data has not been recorded in the packet from which data is requested to be reproduced while the formatting operation is being performed, a reproducing operation can be performed by using the pseudo-data. Thus, the reproducing operation can be performed without the user being conscious of the formatting process being performed as a background process.

Additionally, when the fixed packets have not been recorded in the designated area by the formatting process, previously prepared information is output as a result of reproduction. Accordingly, a reproducing operation can be substitutionally performed even when a reproducing operation cannot be performed due to the fact that the formatting operation on the area subjected to the reproduction by interrupting the formatting process has not ended.

A description will now be given of a process when an instruction for ejection of the optical disc is provided while the formatting operation is being performed in the optical disc recording and reproducing apparatus according to the present embodiment.

If the optical disc 1 is ejected while the formatting process is being progressed, the formatting process cannot be continued. Additionally, the formatting of the ejected optical disc is incomplete and a recording and reproducing operation cannot be performed on the optical disc.

Accordingly, in the optical disc recording and reproducing apparatus according to the present embodiment, the optical disc 1 is prevented from being ejected when the formatting process is being performed.

Figure 9:
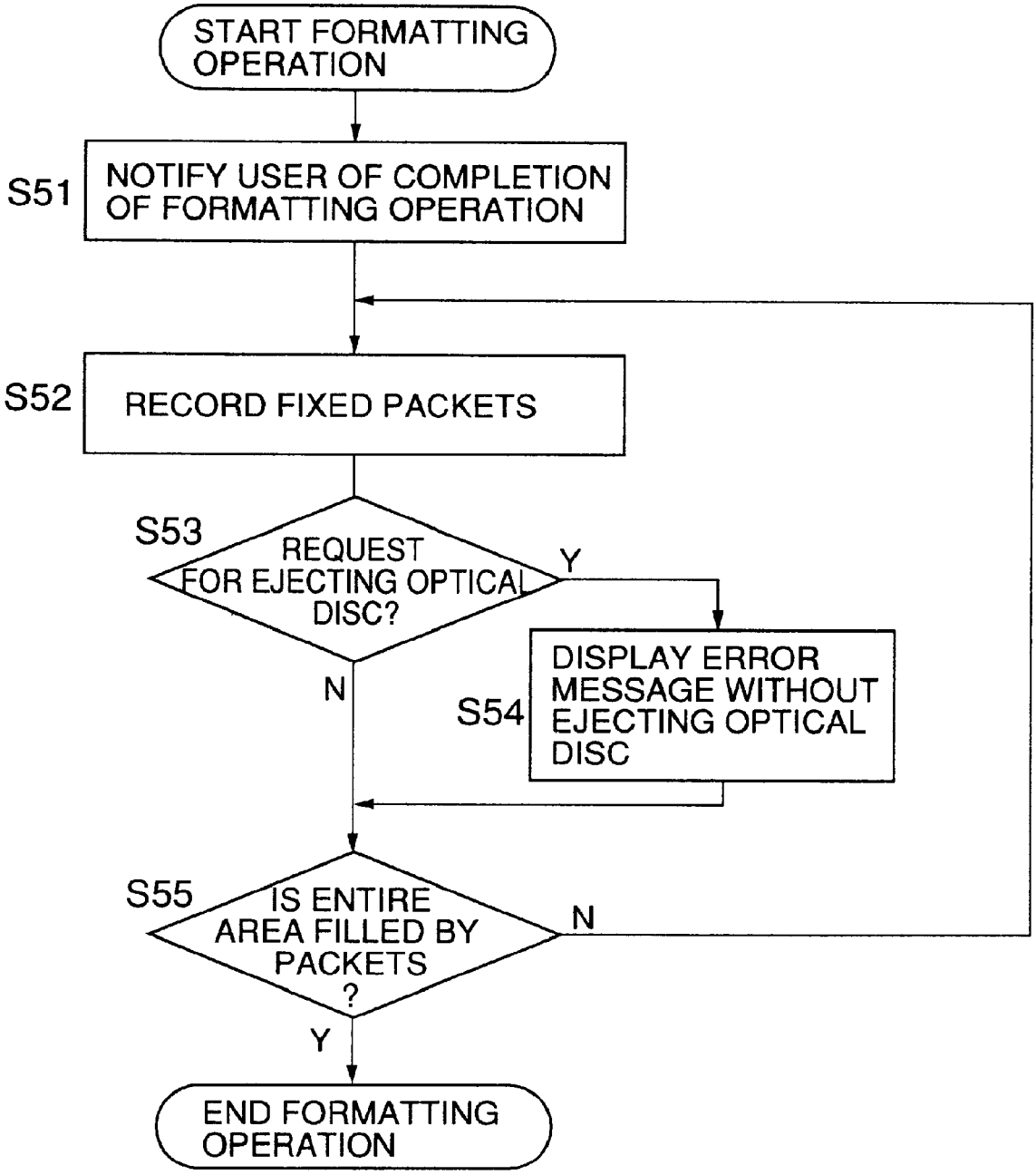
FIG. 9 is a flowchart of a formatting process performed by the optical disc recording and reproducing apparatus shown in FIG. 1 when a request for ejecting the optical disc is made while the formatting process is being performed as a background process.

FIG. 9 is a flowchart of a process when an instruction for ejecting an optical disc is provided during the formatting operation in the optical disc recording and reproducing apparatus according to the present embodiment.

In the process shown in FIG. 9, immediately after the formatting process for the optical disc 1 is started, the controller 9 outputs, in step S51, a message to a host computer so as to notify a user (the host computer) that the formatting process has been completed. Then, in step S52, an actual formatting operation is performed as a background process of the host computer. In the formatting operation, the entire area or a designated area of the optical disc 1 is filled by packets having a fixed length. It is then determined, in step S53, whether or not a request for ejecting the optical disc is sent from the host computer.

If it is determined, in step S53, that a request for ejecting the optical disc is not sent from the host computer, the routine proceeds to step S55. On the other hand, if it is determined, in step S53, that a request for ejecting the optical disc is sent from the host computer, the routine proceeds to step S54. In step S54, the formatting operation is continued without ejecting the optical disc 1 and an error message is output to the host computer, and the routine proceeds to step S55.

In step S55, it is determined whether or not the area to be formatted is filled by the fixed packets. If the area is not filled by the fixed packets, the routine returns to step S52 so as to repeat the process of steps S52 to S54. If it is determined that the entire area to be formatted is filled by the fixed packets, the routine is ended.

As mentioned above, the optical disc 1 is not ejected when the formatting operation is being performed so that a recording and reproducing operation is prevented from not being performed due to the incomplete formatting.

It should be noted that the above-mentioned formatting process may be performed in accordance with programs stored in a memory provided in the controller 9. The program data may be stored in a CD-ROM which is readable by the optical disc recording and reproducing apparatus, or may be supplied from the host computer via the interface 10.

The present invention is not limited to the specifically disclosed embodiments, and variations and modifications may be made without departing from the scope of the present invention.

The present application is based on Japanese priority application No.9-227921 filed on Aug. 25, 1997, the entire contents of which are hereby incorporated by reference.

What is claimed is:

1. An optical disc recording and reproducing apparatus, comprising:

recording means for recording data on a rewritable optical disc by using a fixed packet write method;

reproducing means for reproducing data recorded on said optical disc by said recording means; and background formatting means for formatting said optical disc by a formatting process performed as a background process so that when at least one of a recording process and a reproducing process is requested, the formatting process is interrupted and the one of the recording process and reproducing process is performed and the formatting process is resumed after the one of the recording process and the reproducing process is ended, the formatting process being performed so as to fill at least a predetermined part of a recording area of said optical disc by packets having a fixed length.

2. An optical disc recording and reproducing apparatus, comprising;

recording means for recording data on a rewritable optical disc using a fixed packet write method;

reproducing means for reproducing data recorded on said optical disc by said recording means; and background formatting means for formatting said optical disc by formatting process performed as a background process so that another process is acceptable after a start of the formatting process, the formatting process being performed so as to fill at least a predetermined part of a recording area of said optical disc by packets having a fixed length, wherein said background formatting means includes end of process acknowledging means for notifying of completion of the formatting process before the formatting process is completed.

3. The optical disc recording and reproducing apparatus as claimed in claim 2, wherein said background formatting means includes means for interrupting the formatting process when a request for recording user data is made, recording the user data on said optical disc and thereafter resuming the formatting process.

4. The optical disc recording and reproducing apparatus as claimed in claim 3, wherein said background formatting means includes means for resuming the formatting process by excluding an area in which the user data has been recorded from among areas to be formatted when the packets having a fixed length are not yet recorded in the area in which the user data has been recorded.

5. The optical disc recording and reproducing apparatus as claimed in claim 2, wherein said background formatting means include means for interrupting the formatting process when a request for reproducing data recorded in a designated area is made, reproducing the data and thereafter resuming the formatting process.

6. The optical disc recording and reproducing apparatus as claimed in claim 5, wherein said background formatting means includes means for outputting previously prepared information as a result of reproduction of data recorded in said designated area when the packets having a fixed length are not yet recorded in said designated area by execution of the formatting process.

7. The optical disc recording and reproducing apparatus as claimed in claim 2, wherein said background formatting means includes means for prohibiting ejection of said optical disc when a request for ejecting said optical disc is made during an execution of the formatting process.

8. A formatting method for formatting a rewritable optical disc, data being recorded on said optical disc by using a fixed packet write method, said formatting method comprising the steps of:

starting a formatting process for said optical disc as a background process, the formatting process being performed so as to fill a recording area of said optical disc by packets having a fixed length;

enabling execution of at least one of a recording process and a reproducing process by interrupting the formatting process and resuming the formatting process after the at least one of the recording process and the reproducing process is ended; and ending the formatting process after the recording area to be formatted has been filled by the packets having the fixed length.

9. A formatting method for formatting a rewritable optical disc, data being recorded on said optical disc by using fixed packet write method, said formatting method comprising the steps of:

starting a formatting process for said optical disc as a background process, the formatting process being performed so as to fill a recording area of said optical disc by packets having a fixed length;

enabling execution of another process while the formatted process is being performed; and ending the formatting process after the recording are to be formatted has been filled by the packets having the fixed length, wherein the step of enabling comprises the step of notifying completion of the formatting process before the formatting process is completed.

10. The formatting method as claimed in claim 9, further comprising the steps of:

interrupting the formatting process when a request for recording user data is made;

recording the user data on said optical disc; and resuming the formatting process after the user data has been recorded.

11. The formatting method as claimed in claim 10, wherein the step of resuming includes the step of excluding an area in which the user data has been recorded from among areas to be formatted when the packets having the fixed length are not yet recorded in the area in which the user data has been recorded.

12. The formatting method as claimed in claim 9, further comprising the steps of:

interrupting the formatting process when a request for reproducing data recorded in a designated area is made;

reproducing the data in said designated area; and resuming the formatting process after the data in said designated area has been reproduced.

13. The formatting method as claimed in claim 12, wherein the step of reproducing includes the step of outputting previously prepared information as a result of reproduction of the data recorded in said designated area when the packets having a fixed length are not yet recorded in said designated area by execution of the formatting process.

14. The formatting method as claimed in claim 9, further comprising the step of prohibiting ejection of said optical disc when a request for ejecting said optical disc is made during an execution of the formatting process.

15. A processor readable medium for storing program code for causing an optical disc recording and reproducing apparatus to format a rewritable optical disc, data being recorded on said optical disc by using a fixed packet write method, comprising:

program code means for starting a formatting process for said optical disc as a background process, the formatting process being performed so as to fill a recording area of said optical disc by packets having a fixed length;

program code means for enabling execution of at least one of a recording process and a reproducing process by interrupting the formatting process and resuming the formatting process after the at least one of the recording process and the reproducing process is ended; and program code means for ending the formatting process after the recording area to be formatted has been filled by the packets having the fixed length.

16. A processor readable medium for storing program code for causing an optical disc recording and reproducing apparatus to format a rewritable optical disc, data being recorded on said optical disc by using a fixed packet write method, comprising:

program code means for starting a formatting process for said optical disc as a background process, the formatting process being performed so as to fill a recording area of said optical disc by packets having a fixed length;

program code means for enabling execution of another process while the formatting process is being performed; and program code means for ending the formatting process after the recording area to be formatted has been filled by packets having a fixed length, wherein the program code means for enabling comprises program code means for notifying completion of the formatting process before the formatting process has been completed.

17. The processor readable medium as claimed in claim 16, further comprising:

program code means for interrupting the formatting process when a request for recording user data is made;

program code means for recording the user data on said optical disc; and program code means for resuming the formatting process after the user data has been recorded.

18. The processor readable medium as claimed in claim 17, wherein the program code means for resuming includes program code means for excluding an area in which the user data has been recorded from among areas to be formatted when the packets having the fixed length are not yet recorded in the area in which the user data has been recorded.

19. The processor readable medium as claimed in claim 16, further comprising:

program code means for interrupting the formatting process when a request for reproducing data recorded in a designated area is made;

program code means for reproducing the data in said designated area; and program code means for resuming the formatting process after the data has been recorded in said designated area.

20. The processor readable medium as claimed in claim 19, wherein the program code means for reproducing includes program code means for outputting previously prepared information as a result of reproduction of the data recorded in said designated area when the packets having a fixed length are not recorded in said designated area by execution of the formatting process.

21. The processor readable medium as claimed in claim 16, further comprising program code means for prohibiting ejection of said optical disc when a request for ejecting said optical disc is made during an execution of the formatting process.

*22. A formatting method as in claim 9, further comprising communicating information between a host computer and a disc recording and reproducing apparatus after starting a formatting operation but before starting the formatting process that is performed as a background process.*

*23. The formatting method as claimed in claim 22, further comprising the steps of:*

*interrupting the formatting process when a request for recording user data is made;*

*recording the user data on said optical disc; and*

*re-starting the formatting process after the user data has been recorded.*

*24. The formatting method as claimed in claim 23, wherein the step of re-starting includes the step of excluding an area in which the user data has been recorded from among areas to be formatted when the packets having the fixed length are not yet recorded in the area in which the user data has been recorded.*

*25. The formatting method as claimed in claim 22, further comprising the steps of:*

*interrupting the formatting process when a request for reproducing data recorded in a designated area is made;*

*reproducing the data in said designated area; and*

*re-starting the formatting process after the data in said designated area has been reproduced.*

*26. The formatting method as claimed in claim 25, wherein the step of reproducing includes the step of outputting previously prepared information as a result of reproduction of the data recorded in said designated area when the packets having a fixed length are not yet recorded in said designated area by execution of the formatting process.*

*27. The formatting method as claimed in claim 22, wherein the step of communicating information comprises testing whether data packet has been recorded and, depending on a result of the testing, performing other steps before starting said formatting process as a background process.*

*28. A formatting method for formatting a rewritable optical disc, data being recorded on said optical disc by using fixed packet write method, said formatting method comprising the steps of:*

*starting a formatting operation comprising communicating information between a host computer and a disc recording and reproducing apparatus;*

*starting a formatting process for said optical disc as a background process, the formatting process being performed so as to fill a recording area of said optical disc by packets having a fixed length;*

*enabling execution of another process while the formatted process is being performed; and*

*ending the formatting process after the recording are to be formatted has been filled by the packets having the fixed length, wherein the step of enabling comprises the step of notifying completion of the formatting process before the formatting process is completed.*

* * * * *